(12) United States Patent
Chou

(10) Patent No.: US 7,965,049 B2
(45) Date of Patent: Jun. 21, 2011

(54) ELECTRIC ENERGY CONTROL CIRCUIT FOR SOLAR POWER ILLUMINATION SYSTEM

(75) Inventor: Heng-Yi Chou, Tainan County (TW)

(73) Assignee: King EnerTech Systems Corp., Yongkang, Tainan County (TW)

( * ) Notice: Subject to any disclaimer, the term of this patent is extended or adjusted under 35 U.S.C. 154(b) by 585 days.

(21) Appl. No.: 12/144,263

(22) Filed: Jun. 23, 2008

(65) Prior Publication Data

US 2009/0316392 A1 Dec. 24, 2009

(51) Int. Cl.
*H05B 41/36* (2006.01)
(52) U.S. Cl. .......... 315/307; 315/308; 323/906
(58) Field of Classification Search .......... 315/119, 315/120, 121, 127, 128, 186, 192, 193, 209 R, 315/210, 211, 291, 294, 297, 299, 300, 302, 315/312; 323/906
See application file for complete search history.

(56) References Cited

U.S. PATENT DOCUMENTS

| 6,120,165 | A  | * | 9/2000 | Shalvi | 362/276 |
| 6,590,793 | B1 | * | 7/2003 | Nagao et al. | 363/95 |
| 2008/0084178 | A1 | * | 4/2008 | Dowd et al. | 320/101 |

* cited by examiner

*Primary Examiner* — Douglas W Owens
*Assistant Examiner* — Jianzi Chen
(74) *Attorney, Agent, or Firm* — Muncy, Geissler, Olds & Lowe, PLLC

(57) ABSTRACT

The present invention discloses an electric energy control circuit for a solar power illumination system. The solar power illumination system has at least one solar panel coupled to a charging controller, and the solar panel charges at least one battery via the charging controller. An electric energy control circuit according to the present invention controls a driving unit to acquire electric energy from the battery and turn on at least one lamp set. The electric energy control circuit comprises: a power detection loop and an output control loop. The power detection loop is coupled to the solar panel and the battery and detects the power generation of the solar panel and the remaining capacity of the battery. The output control loop is coupled to the power detection loop and determines the power output to the lamp set according to the power generation and the remaining capacity. Thereby, the present invention can modulate the power for the solar power illumination system according to the weather, prolong the power supply time of the battery, and reduce the bad weather-induced attrition of the solar power illumination system.

11 Claims, 3 Drawing Sheets

ELECTRIC ENERGY CONTROL CIRCUIT FOR SOLAR POWER ILLUMINATION SYSTEM

FIELD OF THE INVENTION

The present invention relates to an electric energy control circuit for a solar power illumination system, particularly to a circuit, which evaluates the remaining battery capacity and modulates the power for lamps in a solar power illumination system.

BACKGROUND OF THE INVENTION

In the age of energy shortage and environmentalism, solar energy has been an important substitute energy, and solar panels usually cooperate with high capacity batteries to achieve flexible solar energy application. Many public illumination devices are long time radiated by sunlight. If they are powered by solar energy, considerable electric power will be saved. In solar energy powered illumination devices, batteries store the electric energy, which is converted from solar energy, and timers turn on lamps using electric energy after sunset/turn off lamps to store electric energy after sunrise. Thereby, the solar energy powered illumination devices store energy during daytime and light up lamps at night regularly to make the best use of the environment-friendly energy. However, the abovementioned design has the intrinsic problem of solar energy. When the weather is unfavorable during daytime, solar panels absorb solar energy lower than the designed value, but the batteries still have to release energy to lamps at night. If there is a bad weather lasting for several successive days, the remaining battery capacity will persistently decrease, which may cause incapability of lighting lamps or interruption of lamp illumination and thus induce the problem of public security. Besides, the persistent low battery remaining capacity caused by a long-term bad weather will shorten the lifetime of batteries, which will obviously increase the repair and maintenance expense. At present, the conventional solar energy illumination devices still lack an effective solution for the abovementioned problems, which consumes budgets and impairs the popularization thereof.

SUMMARY OF THE INVENTION

One objective of the present invention is to provide a control circuit, which modulates the power output in the lamp-lighting interval according to the power generation of solar panels to reduce the bad weather-induced attrition of a solar power illumination system and solves the problem that weather affects the lifetime of a conventional solar power illumination system outputting a fixed power in the fixed lamp-lighting interval preset by a timer.

The present invention discloses an electric energy control circuit for a solar power illumination system. The solar power illumination system has at least one solar panel coupled to a charging controller, and the solar panel charges at least one battery via the charging controller. The electric energy control circuit of the present invention controls a driving unit to acquire electric energy from the battery and turn on at least one lamp set. The electric energy control circuit comprises: a power detection loop and an output control loop. The power detection loop is coupled to the solar panel and the battery and generates a power generation signal and a remaining capacity signal according to the power generation of the solar panel and the remaining capacity of the battery. The output control loop is coupled to the power detection loop to receive the power generation signal and the remaining capacity signal and determines the power output to the lamp set according to the power generation signal and the remaining capacity signal. The power control loop has a time-setting mode controlling the lamp-lighting interval and a power-distribution mode having different power output ratios within a fixed lamp-lighting interval. The output control loop generates a driving signal under the time-setting mode or the power-distribution mode to actuate the driving unit, and the driving unit converts the power from the battery into a driving power to turn on the lamp set. Via the abovementioned circuit architecture, the present invention modulates the output power according to the power generation and the remaining capacity, makes the solar power illumination system have different working modes, and adjusts the power of solar power illumination system according to the weather. Thus, the present invention can prolong the power supply time of the battery and reduce the bad weather-induced attrition of the solar power illumination system.

DETAILED DESCRIPTION OF THE PREFERRED EMBODIMENTS

Figure 1:
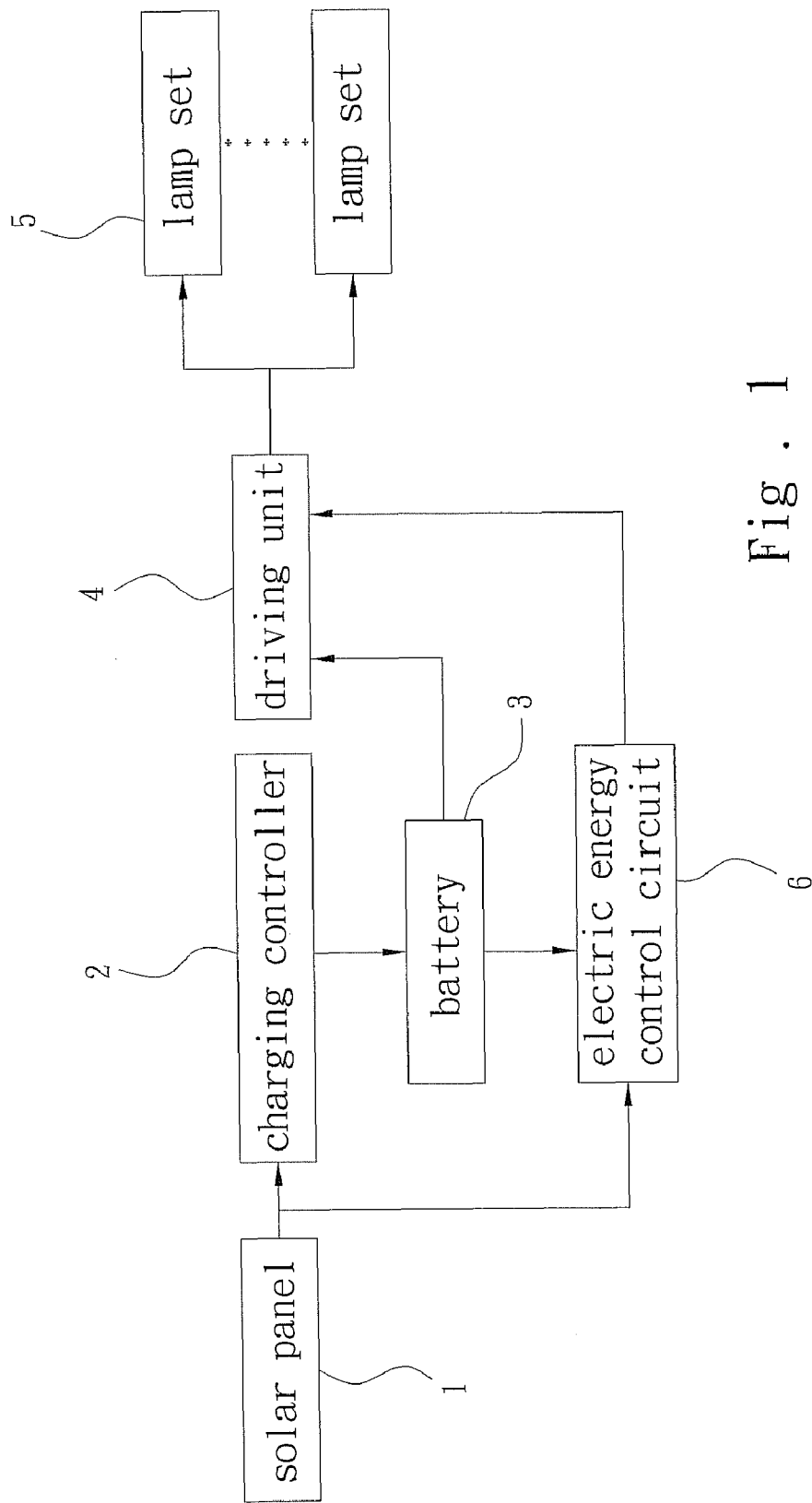
FIG. 1 is a block diagram showing the fundamental circuit architecture according to the present invention.
Figure 2:
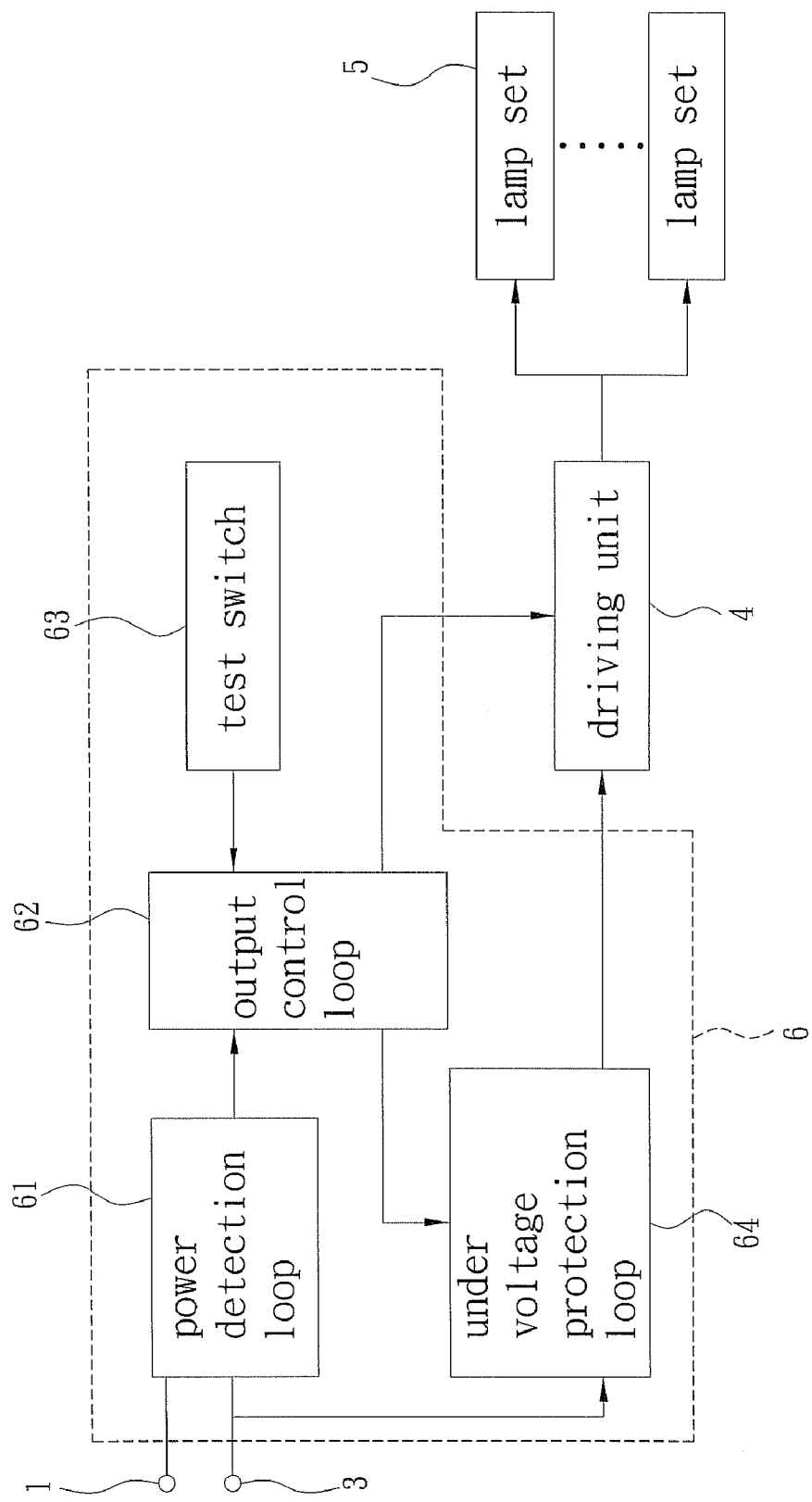
FIG. 2 is a block diagram showing the architecture of an electric energy control circuit according to the present invention.

Refer to FIG. 1 and FIG. 2. The present invention discloses an electric energy control circuit for a solar power illumination system. The solar power illumination system has at least one solar panel 1 coupled to a charging controller 2, and the solar panel 1 charges at least one battery 13 via the charging controller 2. An electric energy control circuit 6 according to the present invention controls a driving unit 4 to acquire electric energy from the battery 3 and turn on at least one lamp set 5. As shown in FIG. 2, the electric energy control circuit 6 comprises: a power detection loop 61 and an output control loop 62. The power detection loop 61 is coupled to the solar panel 1 and the battery 3 and generates a power generation signal and a remaining capacity signal according to the power generation of the solar panel 1 and the remaining capacity of the battery 3. The output control loop 62 is coupled to the power detection loop 61 to receive the power generation signal and remaining capacity signal and determines the power output to the lamp set 5 according to the power generation signal and remaining capacity signal. The power control loop 62 has a time-setting mode controlling the lamp-lighting interval and a power-distribution node having different power output ratios within a fixed lamp-lighting interval. The output control loop 62 generates a driving signal under the time-setting mode or the power-distribution mode to actuate the driving unit 4, and the driving unit 4 converts the power from the battery into a driving power to turn on the lamp set 5. The output control loop 62 also has an under voltage level and compares the remaining capacity signal with the under voltage level and determines whether to output a under capacity signal indicating that the remaining capacity signal is lower than the under voltage signal. The electric energy control circuit 6 may further comprise an under voltage protection loop 64 arranged in the path via which the driving unit 4 acquires power from the battery 3, and the under voltage protection loop 64 is triggered by the under capacity signal to break the power path. The electric energy control circuit 6 may further comprise a test switch 63, and the maintenance worker may press the test switch 63 to test whether the lamp set 5 can light up.

Figure 3:
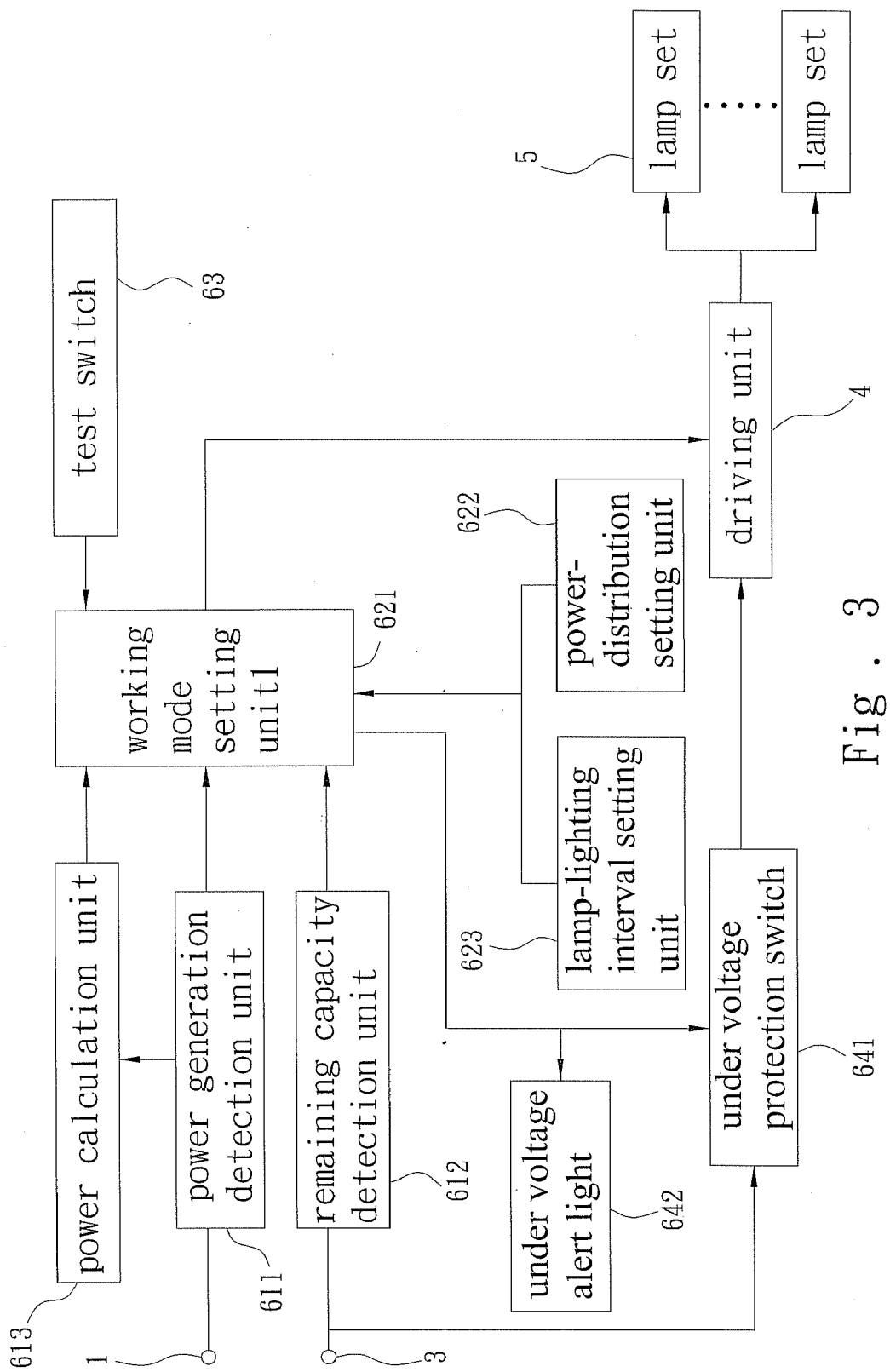
FIG. 3 is a block diagram showing the detailed architecture of an electric energy control circuit according to the present invention.

Refer to FIG. 3 for the detailed architecture of the power detection loop 61 and the output control loop 62. The power detection loop 61 further comprises: a power generation detection unit 611 detecting the voltage output by the solar panel 1 and generating the power generation signal and a remaining capacity detection unit 612 detecting the remaining capacity of the battery 3 and generating the remaining capacity signal. The power detection loop 61 also comprises a power calculation unit 613 receiving the power generation signal, accumulating the power generation signals within a specified interval to calculate the average power in the specified interval and outputting an average power signal to the output control loop 62. The output control loop 62 further comprises: a lamp-lighting interval setting unit 623 used to set a lamp-lighting interval; a power-distribution setting unit 622 used to set different power distribution ratios in the lamp-lighting interval; and a working mode setting unit 621. The maintenance worker may set a lamp-lighting interval in the lamp-lighting interval setting unit 623, and the lamp-lighting interval setting unit 623 will generate a timing signal. The maintenance worker may perform a setting to make the power-distribution setting unit 622 generate a power ratio signal. The working mode setting unit 621 provides the time-setting mode or the power distribution mode according to the timing signal or the power ratio signal. Then, the working mode setting unit 621 determines the length of the lamp-lighting interval via the time-setting mode and determines that the lamp-lighting interval has two stages respectively having different power ratios via the power distribution mode. The working mode setting unit 621 of the output control loop 62 may further have a high voltage level and a low voltage level and compares the remaining capacity signal with the high voltage level and the low voltage level to determine the level of the remaining capacity of the battery 3 and then determines whether to output a preset normal power or the average power to the lamp set 5. When the remaining capacity signal is higher than the high voltage level, the driving unit 4 lights up the lamp set 5 in the lamp-lighting interval with the normal power expected by the maintenance worker. When the remaining capacity signal is between the high voltage level and the low voltage level, the driving unit 4 lights up the lamp set 5 in the lamp-lighting interval with the average power indicated by the power calculation unit 613. When the remaining capacity signal is lower than the low voltage level, the driving unit 4 lights up the lamp set 5 with a power lower than the average power. Below are described the examples based on the abovementioned design. In an example of the time-setting mode, the maintenance worker sets the lamp-lighting interval to be an interval from 18:00 to 04:00 of the next day. After 18:00, the driving unit 4 lights up the lamp set 5 with the normal power preset by the maintenance worker if the working mode setting unit 621 detects that the remaining capacity signal generated by the remaining capacity detection unit 612 is higher than the high voltage level. If the voltage of the battery 3 decreases to such an extent that the remaining capacity signal is between the high voltage level and the low voltage level, the driving unit 4 lights up the lamp set 5 with the average power indicated by the power calculation unit 613, whereby the output power is automatically modulated to prolong the lifetime of the battery 3. Besides, the power-distribution setting unit 622 may set the front stage and rear stage of the lamp-lighting interval to respectively have different power output ratios. For example, the front stage has a power output of 60% of the average power, and the rear stage has a power output of 40% of the average power. The output power in the lamp-lighting interval can be expressed by the following equations:

$$W_{output} = W_{average} \times 0.6 \div Tn \div 2 \text{ the output power in the front stage}$$

$$W_{output} = W_{average} \times 0.4 \div Tn \div 2 \text{ the output power in the rear stage}$$

wherein $W_{output}$ is the power driving the driving unit 4 to light up lamps, and $W_{average}$ is the average power generation. Therefore, the power-distribution mode can prolong the power supply time of the battery 3 and reduce the attrition of a solar power illumination caused by bad weather. Furthermore, the under voltage protection loop 64 may comprises an under voltage protection switch 641 and an under voltage alert light 642. The under voltage protection switch 641 is arranged in the path from the battery 3 to the driving unit 4 and triggered by the under capacity signal to break the path via which the power of the battery 3 is sent to the driving unit 4. The under voltage alert light 642 is also triggered by the under capacity signal to indicate that the remaining battery capacity is too low.

In addition to using the lamp-lighting interval setting unit 623 to set a lamp-lighting interval, the output control loop 62 may also set a low power generation level. When the power generation signal is lower than the low power generation level, sunset is confirmed, and the working mode setting unit 621 is triggered. The driving unit 4 may be a switch-type converter, and the output control loop 62 controls the driving unit 4 to output the driving power with the driving signal. As shown in FIG. 3, the electric energy control circuit 6 further comprises a test switch 63, and the maintenance worker may test whether the lamp set 5 can light up via pressing the test switch 63 to actuate the working mode setting unit 621 and turn on the lamp set 5. In conclusion, the present invention outputs power in different modes according to the power generation of the solar panel 1 and the remaining capacity of the battery 3. Thereby, the solar power illumination system can anytime modulate the output power with the electric energy control circuit 6. Thus, the power supply time of the battery is prolonged, and the bad weather-induced attrition of the solar power illumination system is reduced.

What is claimed is:

1. An electric energy control circuit for a solar power illumination system, wherein said solar power illumination system has at least one solar panel coupled to a charging controller, and said solar panel charges at least one battery via said charging controller, and said electric energy control circuit controls a driving unit to acquire electric energy from said battery and turn on at least one lamp set, comprising:

a power detection loop, coupled to said solar panel and said battery, and generating a power generation signal and a remaining capacity signal according to a power generation of said solar panel and a remaining capacity of said battery; and an output control loop, coupled to said power detection loop to receive said power generation signal and said remaining capacity signal and determine the power output to turn on said lamp set, setting a time-setting mode to control a lamp-lighting interval and a power-distribution mode having different power output ratios within a fixed lamp-lighting interval, generating a driving signal under said time-setting mode or said power-distribution mode to actuate said driving unit to convert power from said battery into a driving power to turn on said lamp set.

2. The electric energy control circuit for a solar power illumination system according to claim 1, wherein said output control loop has an under voltage level and compares said remaining capacity signal with said under voltage level and outputs an under capacity signal indicating that said remaining capacity signal is lower than said under voltage signal; an under voltage protection loop is arranged in a path via which said driving unit acquires power from said battery, and said under voltage protection loop is triggered by said under capacity signal to break said path.

3. The electric energy control circuit for a solar power illumination system according to claim 2, wherein said under voltage protection loop further comprises: an under voltage protection switch triggered by said under capacity signal to break, and an under voltage alert light triggered by said under capacity signal.

4. The electric energy control circuit for a solar power illumination system according to claim 1, wherein said power detection loop further comprises: a power generation detection unit detecting a voltage output by said solar panel and generating said power generation signal, and a remaining capacity detection unit detecting a remaining capacity of said battery and generating said remaining capacity signal.

5. The electric energy control circuit for a solar power illumination system according to claim 4, wherein said power detection loop further comprises a power calculation unit receiving and accumulating said power generation signals to calculate an average power in a specified interval, and outputting said average power signal to said output control loop.

6. The electric energy control circuit for a solar power illumination system according to claim 5, wherein said output control loop has a high voltage level and a low voltage level and compares said remaining capacity signal with said high voltage level and said low voltage level to determine whether to output a preset normal power or said average power to said lamp set.

7. The electric energy control circuit for a solar power illumination system according to claim 6, wherein said normal power is preset by a maintenance worker.

8. The electric energy control circuit for a solar power illumination system according to claim 1, wherein said output control loop further comprises: a lamp-lighting interval setting unit used to set a lamp-lighting interval; a power-distribution setting unit used to set different power distribution ratios in a lamp-lighting interval; and a working mode setting unit; said lamp-lighting interval setting unit generates a timing signal; said power-distribution setting unit generates a power ratio signal; said working mode setting unit provides a time-setting mode or a power distribution mode according to said timing signal or said power ratio signal.

9. The electric energy control circuit for a solar power illumination system according to claim 8, wherein said output control loop sets a low power generation level, when said power generation signal is lower than said low power generation level, sunset is confirmed, and said working mode setting unit is triggered.

10. The electric energy control circuit for a solar power illumination system according to claim 1, wherein said driving unit is a switch-type converter, and said output control loop controls said driving unit to output said driving power with said driving signal.

11. The electric energy control circuit for a solar power illumination system according to claim 1, wherein said electric energy control circuit further comprises a test switch, and a maintenance worker presses said test switch to test whether said lamp set can light up.

\* \* \* \* \*